United States Patent
Monteiro Soares et al.

(10) Patent No.: US 11,416,299 B2
(45) Date of Patent: Aug. 16, 2022

(54) METHOD AND RESOURCE SCHEDULER FOR ENABLING A COMPUTING UNIT TO MAP REMOTE MEMORY RESOURCES BASED ON OPTICAL WAVELENGTH

(71) Applicant: Telefonaktiebolaget LM Ericsson (publ), Stockholm (SE)

(72) Inventors: Joao Monteiro Soares, Solna (SE); Chakri Padala, Bangalore (IN); Amir Roozbeh, Kista (SE); Mozhgan Mahloo, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 16/955,079

(22) PCT Filed: Dec. 20, 2017

(86) PCT No.: PCT/SE2017/051317
§ 371 (c)(1),
(2) Date: Jun. 18, 2020

(87) PCT Pub. No.: WO2019/125249
PCT Pub. Date: Jun. 27, 2019

(65) Prior Publication Data
US 2020/0387402 A1    Dec. 10, 2020

(51) Int. Cl.
*G06F 9/50* (2006.01)
*H04Q 11/00* (2006.01)
*G06F 12/08* (2016.01)

(52) U.S. Cl.
CPC ....... *G06F 9/5016* (2013.01); *H04Q 11/0066* (2013.01); *G06F 12/08* (2013.01);
(Continued)

(58) Field of Classification Search
None
See application file for complete search history.

(56) References Cited

U.S. PATENT DOCUMENTS

| | | |
|---|---|---|
| 2006/0159456 A1 | 7/2006 | Gumaste et al. |
| 2007/0162619 A1 | 7/2007 | Aloni et al. |
| | (Continued) | |

OTHER PUBLICATIONS

International Search Report and Written Opinion for International Application No. PCT/SE2017/051317, dated Sep. 19, 2018, 13 pages.

(Continued)

*Primary Examiner* — Edward J Dudek, Jr.
*Assistant Examiner* — Ralph A Verderamo, III
(74) *Attorney, Agent, or Firm* — Nicholson De Vos Webster & Elliott LLP

(57) ABSTRACT

A method and a resource scheduler for enabling a computing unit to use memory resources in a remote memory pool. The resource scheduler allocates a memory unit in the remote memory pool to the computing unit for usage of memory resources in the allocated memory unit, and assigns an optical wavelength for communication between the computing unit and the allocated memory unit over an optical network. The resource scheduler further configures at least the computing unit with a first mapping between the assigned optical wavelength and the allocated memory unit. Thereby, the optical network can be utilized efficiently to achieve rapid and reliable communication of messages from the computing unit to the allocated memory unit.

18 Claims, 7 Drawing Sheets

(52) U.S. Cl.
CPC ........... *G06F 2209/5011* (2013.01); *H04Q 2011/0086* (2013.01); *H04Q 2213/103* (2013.01)

(56) References Cited

U.S. PATENT DOCUMENTS

| | | |
|---|---|---|
| 2009/0142055 A1 | 6/2009 | Qiu et al. |
| 2012/0203957 A1* | 8/2012 | Schuette ............ G11C 7/1054 711/103 |
| 2013/0066951 A1 | 3/2013 | Agranat et al. |
| 2018/0150391 A1* | 5/2018 | Mitchel .................. H04L 67/10 |

OTHER PUBLICATIONS

"Ericsson Hyperscale Datacenter System 8000," 2016, 5 pages, downloaded from https://www.ericsson.com/hyperscale/cloud-infrastructure/hyperscale-datacenter-system on Jun. 28, 2017.

"Propel Your Data Center Into the Future, Intel® Rack Scale Design," 3 pages, downloaded from https://www.intel.in/content/www/in/en/architecture-and-technology/rack-scale-design-overview.html on Jun. 27, 2017.

International Preliminary Report on Patentability for International Application No. PCT/SE2017/051317, dated Jul. 2, 2020, 10 pages.

\* cited by examiner

METHOD AND RESOURCE SCHEDULER FOR ENABLING A COMPUTING UNIT TO MAP REMOTE MEMORY RESOURCES BASED ON OPTICAL WAVELENGTH

CROSS-REFERENCE TO RELATED APPLICATIONS

This application is a National stage of International Application No. PCT/SE2017/051317, filed Dec. 20, 2017, which is hereby incorporated by reference.

TECHNICAL FIELD

The present disclosure relates generally to a method and a resource scheduler for enabling a computing unit to use memory resources in a remote memory pool.

BACKGROUND

In current server technology, a server basically involves a processing function for processing data and a storing function for storing data, which functions are typically co-located in the same physical entity. It has recently been proposed that a server could be created with "disaggregated" hardware meaning that the processing function resides in a computing unit that uses storing resources in a memory unit which is located separate, i.e. "remote" from the computing unit, e.g. in a cloud-like environment. When the computing unit needs to store data or other information, it can send a memory request over a communication network to a center or the like where storing resources in the form of memory units are available, which may be hired by clients in a cloud-like manner. Such a center with multiple memory units is sometimes referred to as a "memory pool" which term will be used herein.

FIG. 1 illustrates a conventional way of employing a server comprised of a computing unit 100 and storing resources in a remote memory pool 102, the term "remote" basically implying that the memory pool 102 is located separate from the computing unit 100 such that data needs to be communicated between them over a communication network 104 which could be a public or a private network or any combination thereof. The actual physical distance between the computing unit 100 and the remote memory pool 102 has no particular significance in this description.

The memory pool 102 thus comprises multiple memory units 102A, of which only a few are shown in this figure for simplicity, and one or more of them can be selected and allocated for use by the computing unit 100. It is also possible to allocate only a portion of a memory unit to a computing unit. In this example, "Memory unit-1" has been selected and allocated for the computing unit 100 and data is thus communicated between computing unit 100 and Memory unit-1 over the communication network 104. The computing unit 100 may similarly reside in a data center or the like with multiple computing units, not shown. In this network 104, existing solutions that can be used for managing connections between hardware components are dependent on the Internet Protocol, IP, Ethernet, InfiniBand or other communication protocols.

When sending data or a request for storing resources to the memory pool 102, the computing unit 100 typically needs to address the individual memory unit(s) 102A allocated to the computing unit 100. In such a configuration with the computing unit 100 separated from the memory unit(s) 102A by a communication network, it is a challenge to provide high bandwidth and low latency in the communication between the units 100, 102A across the network.

However, it sometimes necessary to change configuration of the memory pool, e.g. by removing, adding or modifying one or more memory units therein. It may also be necessary to change allocation of one or more memory units to a computing unit, which may require that data used by the computing unit is moved from one memory unit to another. This re-configuring operation requires substantial signaling to the computing unit so as to change its configuration of allocated memory units. Hence, any change of memory unit allocation to the computing unit entails complex and time-consuming signaling.

It is also a drawback that the commonly used communication networks must employ generally time-consuming routing and forwarding operations so that transport of data and messages between the computing unit and the memory pool is typically slow, which reduces the performance of a server or the like comprised of the computing unit and one or more memory units in the memory pool. Moreover, a configuration with point to point optical fibers between each pair of compute unit and memory pool(s), would be both complex and costly to implement, also having low flexibility for adaptions and modifications.

SUMMARY

It is an object of embodiments described herein to address at least some of the problems and issues outlined above. It is possible to achieve this object and others by using a method and a resource scheduler as defined in the attached independent claims.

According to one aspect, a method is performed by a resource scheduler for enabling a computing unit to use memory resources in a remote memory pool. In this method the resource scheduler allocates a memory unit in the remote memory pool to the computing unit for usage of memory resources in the allocated memory unit. The resource scheduler further assigns an optical wavelength for communication between the computing unit and the allocated memory unit over an optical network, and configures the computing unit with a first mapping between the assigned optical wavelength and the allocated memory unit.

Thereby, the computing unit can send a message on the optical wavelength $\lambda$ with the allocated memory unit as destination, which message will be routed by the optical network to the memory pool based on the wavelength $\lambda$, where the message will be routed to the allocated memory unit. It is an advantage that the allocation of the memory unit and transfer of the message can be made very simple and with a minimum of delay, and without requiring any manual activity.

According to another aspect, a resource scheduler is arranged to enable a computing unit to use memory resources in a remote memory pool. The resource scheduler is operable to allocate a memory unit in the remote memory pool to the computing unit for usage of memory resources in the allocated memory unit, and to assign an optical wavelength for communication between the computing unit and the allocated memory unit over an optical network. The resource scheduler is further operable to configure the computing unit with a first mapping between the assigned optical wavelength and the allocated memory unit.

The above method and resource scheduler may be configured and implemented according to different optional embodiments to accomplish further features and benefits, to be described below.

A computer program is also provided comprising instructions which, when executed on at least one processor in the resource scheduler, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
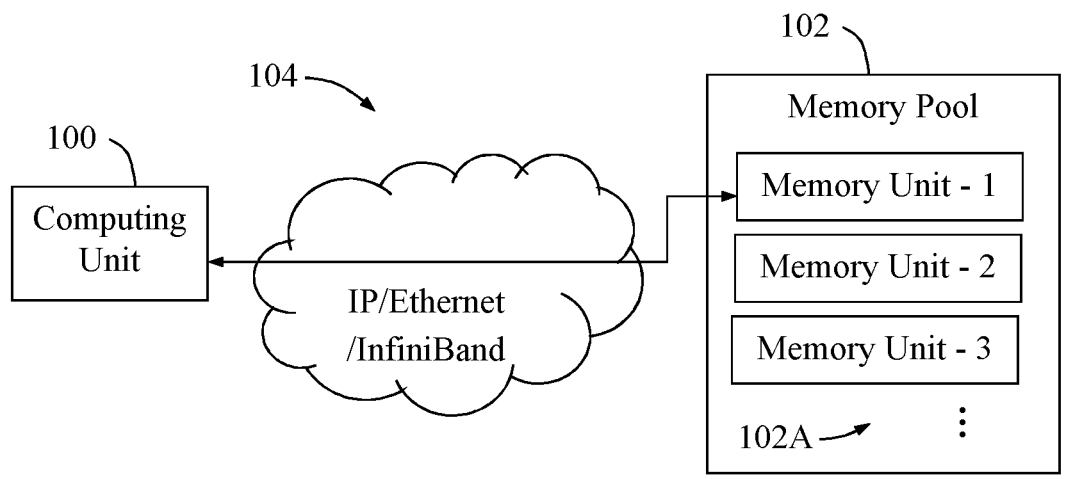
FIG. 1 is a communication scenario illustrating how a computing unit can use memory resources in a remote memory pool, according to the prior art.

Briefly described, a solution is provided to enable efficient and rapid communication of data and other information between a computing unit and a memory pool over a communication network, so as to provide improved performance and reduced delays when the computing unit communicates with one or more memory units in the memory pool. The solution also enables automatic configuration and adaption of the memory unit and the memory pool which thereby does not require any manual activity. It was indicated above that a complete memory unit or only a portion thereof could be allocated to a computing unit, but the examples herein refer to allocation of a single complete memory unit for simplicity although it should be noted that the solution is not limited thereto.

To enable rapid transfer of data and messages from the computing unit, an optical network is used for the communication which is capable of routing signals carried by an optical wavelength towards a destination, based on the optical wavelength. Wavelength based optical networks as such are commonly used in the field of data communication, for rapid and efficient transport of signals in a conventional manner which is not necessary to describe in any detail herein.

The above advantages can be accomplished by functionality in a resource scheduler which configures the computing unit and optionally also the memory pool with wavelength and address mappings so that they can be connected and communicate over an optical network using a specific wavelength that is assigned to the communication. The term "resource scheduler" basically implies a node or entity that is capable of scheduling processing and storing resources for clients or the like, e.g. in a data center with processing resources referred to as "computing units" herein, and in a memory pool with storing resources referred to as "memory units" herein. The resource scheduler is further responsible for assigning optical wavelengths to communications between computing units and memory units. The resource scheduler is also capable of rescheduling storing resources, e.g. in case the memory pool changes its operation and/or hardware in a way that affects an ongoing communication with a computing unit.

Even though the term "cloud" is used herein from time to time as an example, the description is not limited in this respect and the embodiments and examples described herein can be used in other situations as well, such as when both the computing unit and an affiliated memory pool are owned and managed by the same party.

The resource scheduler thus configures the computing unit and optionally also the memory pool and the optical network with an optical wavelength that is assigned for communication of data and messages between the computing unit and an allocated memory unit in the memory pool over an optical network between the computing unit and the memory pool. For example, when the computing unit transmits data or a request for memory resources on the assigned optical wavelength, the data or request will be routed across the optical network to the memory pool according to the used optical wavelength. In the following description, the term "message" is used for short to represent data or a request for storing resources, as sent by a computing unit towards a memory pool.

Figure 2:
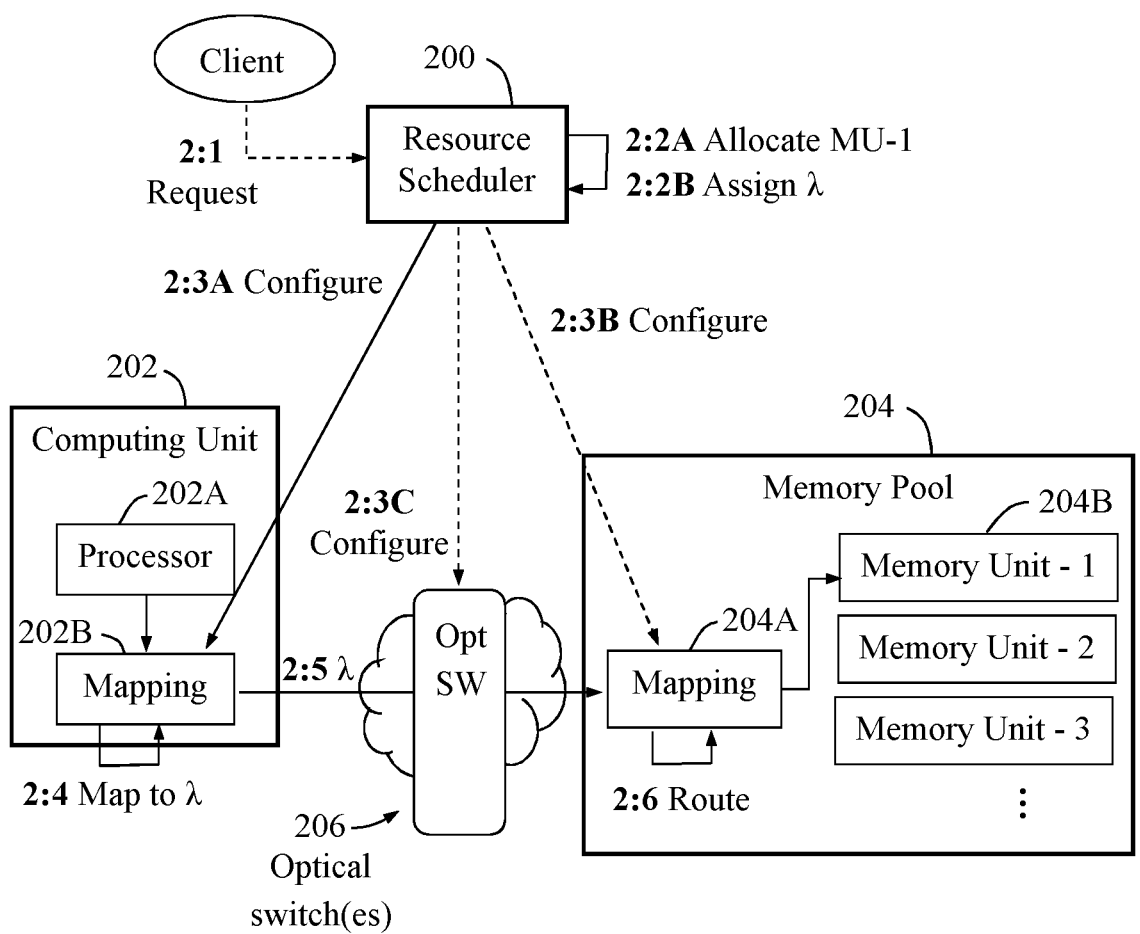
FIG. 2 is a communication scenario illustrating an example of how the solution may be employed, according to some example embodiments.

In FIG. 2, a communication scenario is shown involving a resource scheduler 200, a computing unit 202, a memory pool 204 and an optical network comprising one or more optical switches 206, the figure serving as an illustrative example of how a procedure could be employed by the resource scheduler 200 for enabling the computing unit 202 to use memory resources in the memory pool 204.

In this example scenario, the resource scheduler 200 initially receives a request from a schematically indicated "client", in an action 2:1, to connect a computing unit with at least one memory unit, so as to create a server functionality or the like with processing and storing abilities. In response to said request, the resource scheduler 200 may select and allocate a computing unit from a data center or the like, not shown, and in this example the computing unit 202 is selected or otherwise identified and which comprises some processing functionality schematically indicated as a processor 202A. The computing unit 202 may be identified by the client in the request, e.g. when it is owned and/or controlled by the client. The processing to be performed by the computing unit 202 is outside the procedures described herein, it is just assumed that storing resources are needed.

In response to said request, the resource scheduler 200 allocates storing resources in the memory pool 204 and in this example a memory unit 204B is allocated, in an action 2:2A, to serve the computing unit 202 with storing functionality. As mentioned above, it is possible to allocate more than one memory unit and even only a part of a memory unit, e.g. depending on the request and the current capabilities of available memory units, but the examples herein thus refer to allocation of one complete memory unit for simplicity. It may basically be a matter of practical implementation how and where storing resources in one or more memory units are allocated to a computing unit.

The resource scheduler 200 further assigns an optical wavelength λ for communication of data and messages between the computing unit 202 and the allocated memory unit 204B over the optical network 206, in an action 2:2B. In this description, "an optical wavelength" should be understood as at least one optical wavelength and even though the examples herein refer to an optical wavelength it is also possible that the resource scheduler 200 assigns a range of multiple optical wavelengths for the computing unit 202, which are mapped to different virtual addresses that can be associated to different memory units and/or parts thereof. For example, one optical wavelength may be mapped to one virtual address or to a set of multiple virtual addresses, or a set of multiple optical wavelengths may even be mapped to the same virtual or physical address.

The resource scheduler 200 then configures various mappings in the computing unit 202, the memory pool 204, and in one or more switches 206 in the optical network, as follows. In order to use the configured mappings in communication of messages, the computing unit 202 comprises a mapping function 202B and the memory pool 204 likewise comprises a mapping function 204A.

Firstly, an action 2:3A illustrates that the resource scheduler 200 configures the computing unit 202 with a first mapping between the assigned optical wavelength λ and the allocated memory unit 204B. This mapping may map the wavelength λ to at least one virtual address of one or more allocated memory units. Thereby, the computing unit 202 is able to send a message on the optical wavelength λ with the virtual address as destination, which message will be routed by the network to the memory pool 204 which in turn will route the message to the memory unit(s) that is (are) associated to the virtual address.

Secondly, an action 2:3B illustrates that the resource scheduler 200 in this example further configures the memory pool 204 with the first mapping between wavelength λ and the memory unit 204B which in this case is represented by a virtual address. In this action, the resource scheduler 200 also configures the memory pool 204 with a second mapping that maps the virtual address to a physical address of the allocated memory unit 204B within the remote memory pool. Thereby, the mapping function 204A in memory pool 204 is able to translate the virtual address in a received message to the physical address according to the second mapping and forward the message to memory unit 204B.

Even though the examples herein refer to "a virtual address", the first mapping configured in the memory pool 204 may be done for a range of multiple virtual addresses which could be mapped to one particular optical wavelength. Further, the second mapping may map one virtual address to one physical address, or a set of multiple virtual addresses may be mapped to the same physical address. A memory unit may also have a range of physical addresses representing different parts of its volume.

Thirdly, an action 2:3C illustrates that the resource scheduler 200 further configures optical switches 206 in the optical network with a mapping between the assigned optical wavelength λ and the memory pool 204. Thereby, the optical switches 206 will route any messages coming from the computing unit 202 on the wavelength λ, to the memory pool 204 based on the wavelength λ.

When the above mappings are put into use for communicating a message from the computing unit 202 to the memory unit 204B, the mapping function 202B in the computing unit 202 maps the virtual address of the allocated memory unit 204B to the assigned optical wavelength λ, in an action 2:4. The computing unit 202 then sends the message on the wavelength λ A with the virtual address as destination over the optical network, in another action 2:5, and the optical switches 206 in the network will route the message to the memory pool 204.

When receiving the message with the virtual address on the wavelength λ, the mapping function 204A in the memory pool 204 detects the virtual address as the message's destination and thus routes the message to the memory unit 204B that is associated with that virtual address, in an action 2:6. In more detail, the message is routed to the memory unit's 204B physical address to which the virtual address is mapped according to the second mapping.

In the memory pool 204, each memory unit has at least one routable physical address and the second mapping maps virtual addresses to physical addresses, which mapping may be changed internally if needed without affecting the computing unit 202 nor the optical network's switches 206. For example, a virtual address in use can easily be mapped to a physical address of a new memory unit, just by reconfiguring the second mapping in the memory pool 204 without changing the mappings already configured in the computing unit 202 and in the optical switches 206. Further, the above mappings may be configured in the form of tables, which will be described in more detail later below with reference to some example usage cases illustrated in FIGS. 4-7.

Figure 3:
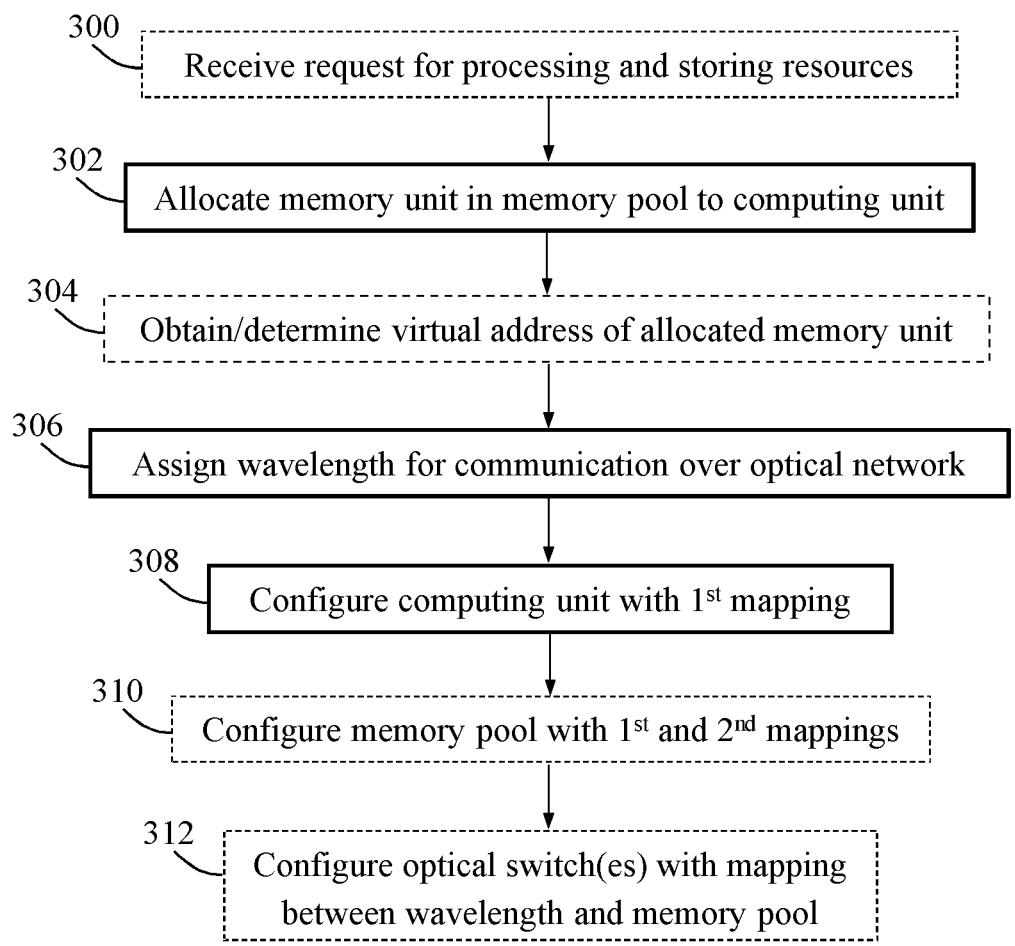
FIG. 3 is a flow chart illustrating a procedure in a resource scheduler, according to further example embodiments.

An example will now be described with reference to the flow chart in FIG. 3, of how the solution may be employed in terms of actions performed by a resource scheduler such as the above-described resource scheduler 200. FIG. 3 is described below with further reference to FIG. 2 although without limitation to such a communication scenario involving the resource scheduler 200. Some optional example embodiments that could be used in this procedure will also be described below.

The actions shown in FIG. 3 are thus performed by a resource scheduler 200 for enabling a computing unit 202 to use memory resources in a remote memory pool 204. It is assumed that the computing unit 202 is able to communicate with the remote memory pool 204 over an optical network comprising one or more optical switches using specific optical wavelengths, which is customary as such in optical networks. A first optional action 300 illustrates that the resource scheduler 200 may receive a request from a client or the like, for connecting the computing unit with at least one memory unit in a memory pool. This action corresponds to action 2:1 above.

In a next action 302, the resource scheduler 200 allocates a memory unit 204B in the remote memory pool 204 to the computing unit 202, for usage of memory resources in the allocated memory unit. This action corresponds to action 2:2A above. In a further action 304, the resource scheduler 200 also assigns an optical wavelength $\lambda_1$ for communication between the computing unit 202 and the allocated memory unit 204B over an optical network 206. This action corresponds to action 2:2B above.

Another optional action 306 illustrates that the resource scheduler 200 may determine or otherwise obtain a virtual address of the allocated memory unit 204B. It is also possible that the memory unit 204B has more than one virtual address. It is further possible that a virtual address is mapped to more than one physical address, and the solution is not limited in this respect. Even though most examples herein refer to a one-to-one mapping between a virtual address and a memory unit, the embodiments herein also allow for other relationships including one virtual address can be mapped to different memory units on different wavelengths so that two or more computing units can use the same virtual address on different wavelengths to access different memory units in the memory pool.

A next action 308 illustrates that the resource scheduler 200 configures the computing unit 202 with a first mapping between the assigned optical wavelength and the allocated memory unit, corresponding to action 2:3A above. Some examples of how this first mapping may be configured in the computing unit 202 will be described later below with reference to FIGS. 4-7.

Some optional example embodiments that could be used in this procedure will now be described. In one example embodiment, the first mapping may map said optical wavelength to at least one virtual address of the allocated memory unit. In this case, the resource scheduler may further configure the remote memory pool 204 with said first mapping and a second mapping, in an optional action 310. The second mapping maps the at least one virtual address to a physical address of the allocated memory unit within the remote memory pool 204. This action corresponds to action 2:3B above.

When the above embodiment is used, another example embodiment may be that the resource scheduler 200 allocates a new memory unit in the same memory pool 204 to the computing unit 202 and reconfigures the second mapping in the remote memory pool to map at least one virtual address to a physical address of the new memory unit. An example of how this embodiment may be employed in practice will be described later below with reference to FIG. 6. In another example embodiment, the first mapping may comprise a range of virtual addresses mapped to the assigned optical wavelength.

In another example embodiment, the resource scheduler 200 may configure at least one optical switch 206 in the optical network with a mapping between the assigned optical wavelength and the memory pool, as illustrated by an optional action 312 which corresponds to action 2:3C above. Alternatively, the optical network and the switch(es) 206 therein may have already been pre-configured to route different optical wavelengths to different memory pools, thus without needing any configuration action from the resource scheduler 200. For example, a set of optical wavelengths may be allotted in the optical network as mapped to different virtual addresses and/or memory units in the same memory pool. Such pre-configuration of routing and wavelengths can also be done through some other management unit, not shown, based on information provided from the resource scheduler 200 about source, destination and wavelengths as decided by the resource scheduler 200.

In another example embodiment, the resource scheduler may perform at least the above actions 302,306, 308 in response to receiving a request for connecting the computing unit with at least one memory unit, as in actions 2:1 and 300.

In another example embodiment, the resource scheduler may assign said optical wavelength for communication between the computing unit 202 and at least two memory units in the remote memory pool 204, and said first mapping may in this case map the assigned optical wavelength to the at least two memory units. An example of how this embodiment may be employed in practice will be described later below with reference to FIG. 4.

In another example embodiment, the resource scheduler may assign different optical wavelengths for communication between at least two computing units and memory units in the remote memory pool over the optical network, and configures each computing unit with a first mapping between a corresponding assigned optical wavelength and the memory units. An example of how the latter embodiment may be employed in practice will be described later below with reference to FIG. 5.

In another example embodiment, the resource scheduler 200 may allocate an added memory unit in a new memory pool to the computing unit 202, and assign a new optical wavelength $\lambda_3$ for communication between the computing unit and the added memory unit. In this case, the resource scheduler 200 also reconfigures the first mapping in the computing unit 202 to map the new optical wavelength to at least one virtual address of the allocated added memory unit. When the latter embodiment is used, another example embodiment may be that the resource scheduler 200 configures the at least one optical switch 206 with a mapping of the new optical wavelength to the new memory pool and the computing unit.

Some examples of how the above-described embodiments could be implemented and used in different practical cases, will now be described with reference to usage cases illustrated in FIGS. 4-7. In the following description, the term "message" is used for short to represent data or a request for storing resources, or a signal that can be used to read and retrieve some data from a memory, as sent by a computing unit towards a memory pool.

Figure 4:
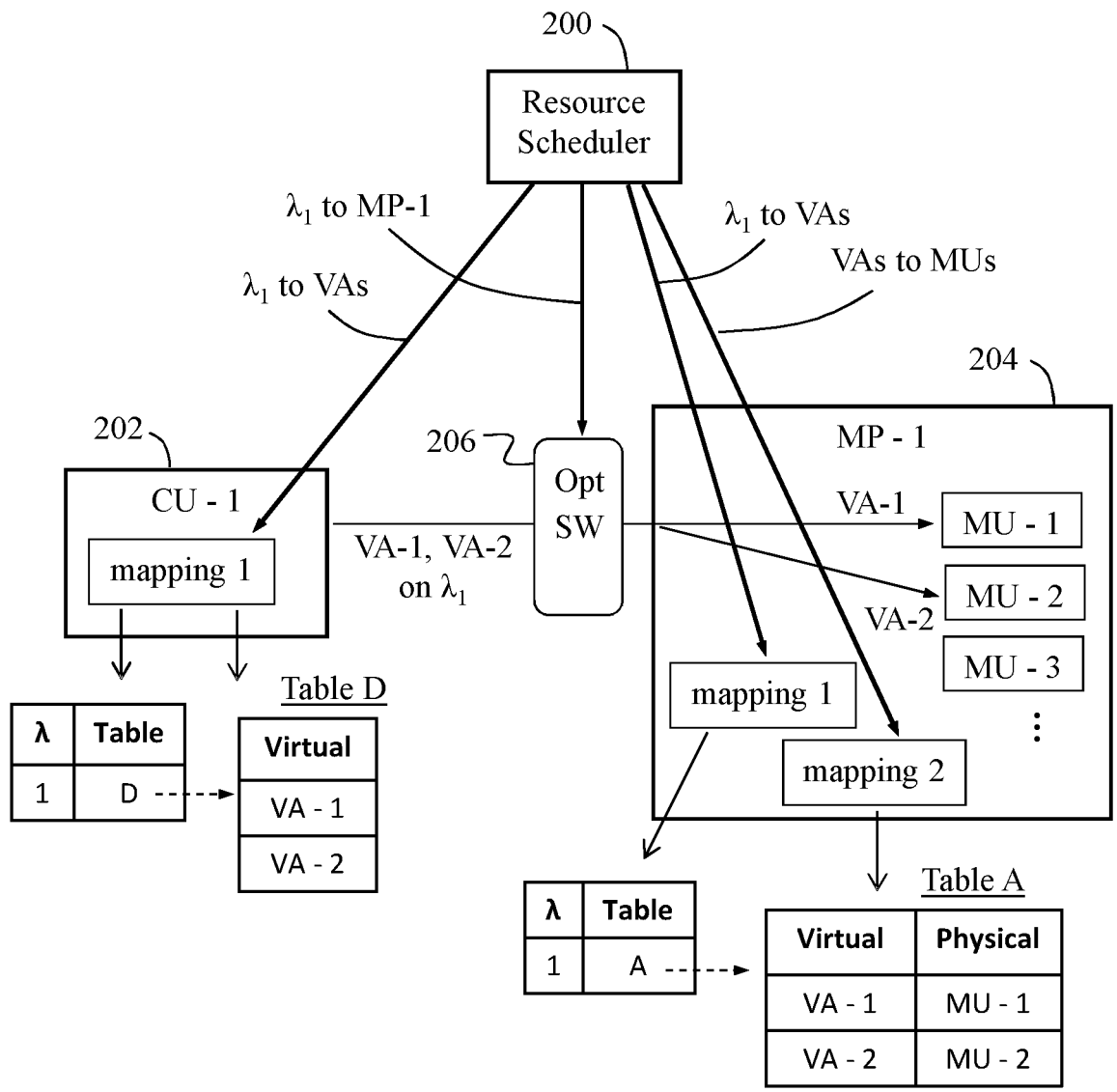
FIG. 4 is a diagram illustrating an example of how the resource scheduler may configure mappings in a computing unit CU-1, in a memory pool MP-1 and in optical switches, according to further example embodiments.

As a first usage case, the above-mentioned embodiment where an optical wavelength $\lambda_1$ is assigned for communication between the computing unit 202 and two memory units in the remote memory pool 204, is illustrated in FIG. 4 where the computing unit 202 is denoted CU-1, and the memory pool 204 is denoted MP-1. The resource scheduler 200 configures the computing unit 202, the memory pool 204 and the optical switch(es) 206 with different mappings as follows.

In more detail, the resource scheduler 200 configures the computing unit 202 and the memory pool 204 with a first mapping, "mapping 1", which basically maps the wavelength $\lambda_1$ to virtual addresses denoted VA-1 and VA-2 associated to two memory units MU-1 and MU-2, respectively. This first mapping is implemented in the computing unit 202 as a mapping of wavelength $\lambda_1$ to a table D which in turn identifies the virtual addresses VA-1 and VA-2. The first mapping is implemented in the memory pool 204 as a mapping of wavelength $\lambda_1$ to a table A which likewise identifies the virtual addresses VA-1 and VA-2.

The resource scheduler 200 further configures the memory pool 204 with a second mapping, "mapping 2", which basically comprises the table A which maps the virtual addresses VA-1 and VA-2 to corresponding physical addresses denoted MU-1 and MU-2. The resource scheduler 200 further configures the optical switch(es) 206 with a mapping of wavelength $\lambda_1$ to the memory pool 204 MP-1.

Thereby, when the computing unit 202 sends a message on the wavelength $\lambda_1$ with VA-1 as destination, the message will be routed to the memory pool 204 according to the wavelength $\lambda_1$. The memory pool 204 will then route the message to MU-1 based on the first and second mappings which indicate that VA-1 is associated with MU-1 for wavelength $\lambda_1$. Likewise, when the computing unit 202 sends a message on the wavelength $\lambda_1$ with VA-2 as destination, the memory pool 204 will route the message to MU-2 based on the first and second mappings which indicate that VA-2 is associated with MU-2 for wavelength $\lambda_1$.

Figure 5:
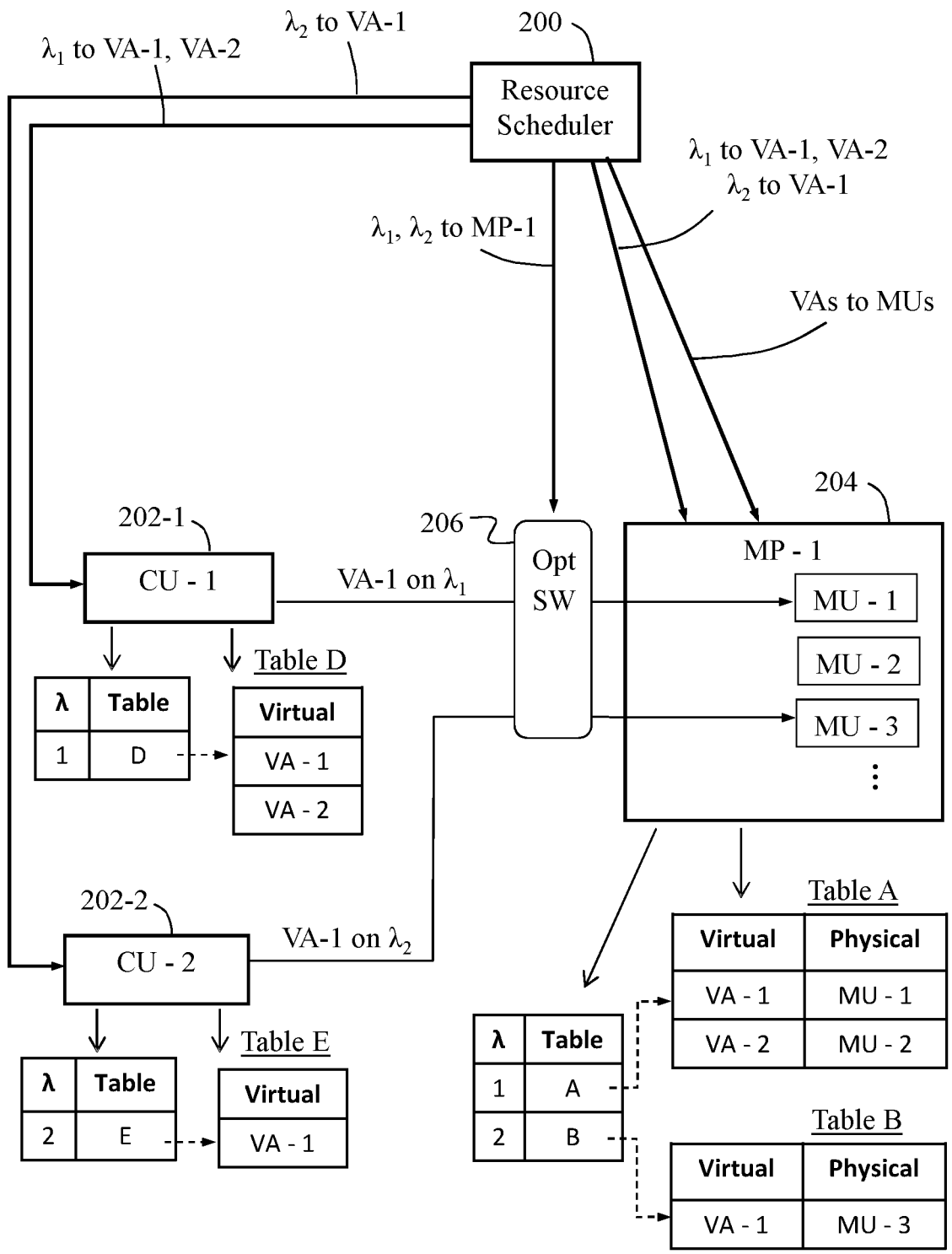
FIG. 5 is a diagram illustrating an example of how the resource scheduler may configure mappings in two computing units CU-1, CU-2, in a memory pool MP-1 and in optical switches, according to further example embodiments.

As a second usage case, FIG. 5 illustrates the above-mentioned embodiment where two different optical wavelengths $\lambda_1$ and $\lambda_2$ are assigned for communication between two computing units 202-1 and 202-2 and two respective memory units MU-1 and MU-3 in the memory pool 204. The resource scheduler 200 configures the computing units 202-1 and 202-2, the memory pool 204 and the optical switch(es) 206 with mappings as follows.

In this example, the resource scheduler 200 configures the computing unit 202-1 and the memory pool 204 with a first mapping which maps the wavelength $\lambda_1$ to virtual addresses VA-1 and VA-2 associated to memory units MU-1 and MU-2, respectively. The first mapping is implemented in the computing unit 202-1 as a mapping of wavelength $\lambda_1$ to a table D which in turn identifies the virtual addresses VA-1 and VA-2. The first mapping is implemented in the other computing unit 202-2 as a mapping of wavelength $\lambda_2$ to a table E which in turn identifies the virtual address VA-1. The first mapping is implemented in the memory pool 204 as a mapping of wavelength $\lambda_1$ to a table A which identifies the virtual addresses VA-1 and VA-2, and a mapping of wavelength $\lambda_2$ to a table B which identifies the virtual addresses VA-1.

The resource scheduler 200 further configures the memory pool 204 with a second mapping which basically comprises the table A which maps the virtual addresses VA-1 and VA-2 on wavelength $\lambda_1$ to corresponding physical addresses MU-1 and MU-2, and the table B which maps the virtual address VA-1 on wavelength $\lambda_2$ to a physical address MU-3. The resource scheduler 200 further configures the optical switch(es) 206 with a mapping of wavelengths $\lambda_1$ and $\lambda_2$ to the memory pool 204 MP-1.

Thereby, when the computing unit 202-1 sends a message on the wavelength $\lambda_1$ with VA-1 as destination, the message will be routed to the memory pool 204 according to the wavelength $\lambda_1$. The memory pool 204 will then route the message to MU-1 based on the first and second mappings which indicate that VA-1 is associated with MU-1 for wavelength $\lambda_1$. When the computing unit 202-2 sends a message on the wavelength $\lambda_2$ likewise with VA-1 as destination, the memory pool 204 will route the message to MU-3 based on the first and second mappings which indicate that VA-1 is associated with MU-3 for wavelength $\lambda_2$.

Figure 6:
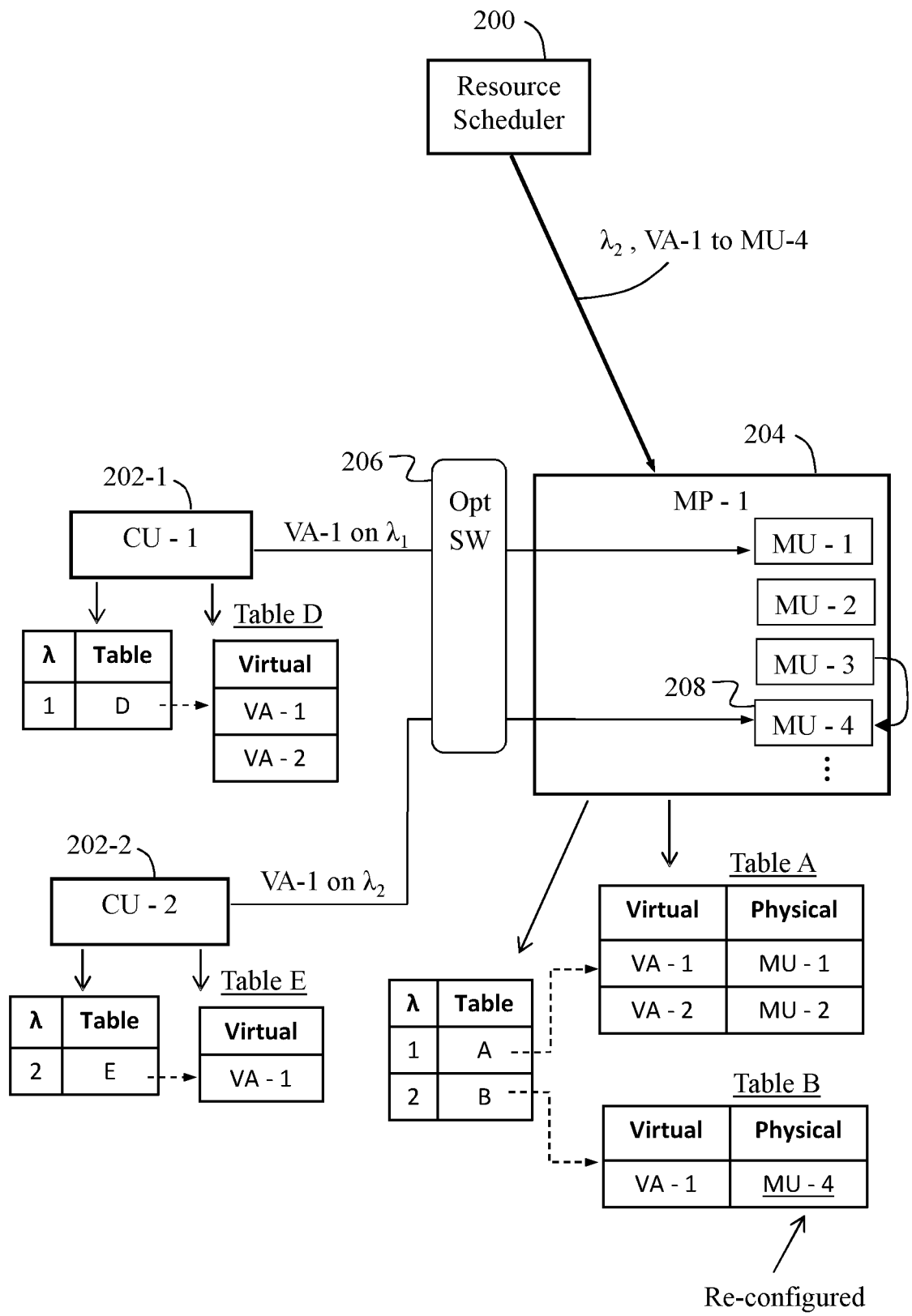
FIG. 6 is a diagram illustrating an example of how the resource scheduler may reconfigure a mapping in a memory pool MP-1 when one of the two computing units in FIG. 5, CU-2, is allocated a new memory unit MU-4 in the same memory pool, according to further example embodiments.

As a third usage case, FIG. 6 illustrates the above-mentioned embodiment where a new memory unit 208 in the same memory pool 204 is allocated to a computing unit 202-2. As in FIG. 5, two optical wavelengths $\lambda_1$ and $\lambda_2$ are assigned for communication between two computing units 202-1 and 202-2 and respective memory units MU-1-MU-3 in the memory pool 204. It is assumed in this example that the resource scheduler 200 has already configured the computing units 202-1 and 202-2, the memory pool 204 and the optical switch(es) 206 with first and second mappings as described above for FIG. 5.

In this example, the resource scheduler 200 at some point reconfigures the second mapping in the memory pool 204 so that VA-1 is mapped to MU-4 instead of MU-3 for wavelength $\lambda_2$. For example, MU-3 may be corrupted, subjected to failure, or considered unsuitable for whatever reason and must be replaced. This reconfiguration is done basically by modifying the table B to map the virtual address VA-1 to a physical address MU-4 of the new memory unit 208. No further reconfiguration is needed and both the computing unit 202-2 and the optical switch(es) 206 are unaffected by this reconfiguration. Another advantage is that the computing unit 202-2 can continue to use storage resources in the memory pool 204 without being aware that a reconfiguration has taken place therein.

Thereby, when the computing unit 202-2 sends a message on the wavelength $\lambda_2$ likewise VA-1 as destination, the memory pool 204 will route the message to MU-4 based on the first and second mappings which indicate that VA-1 is now associated with MU-4 for wavelength $\lambda_2$.

Figure 7:
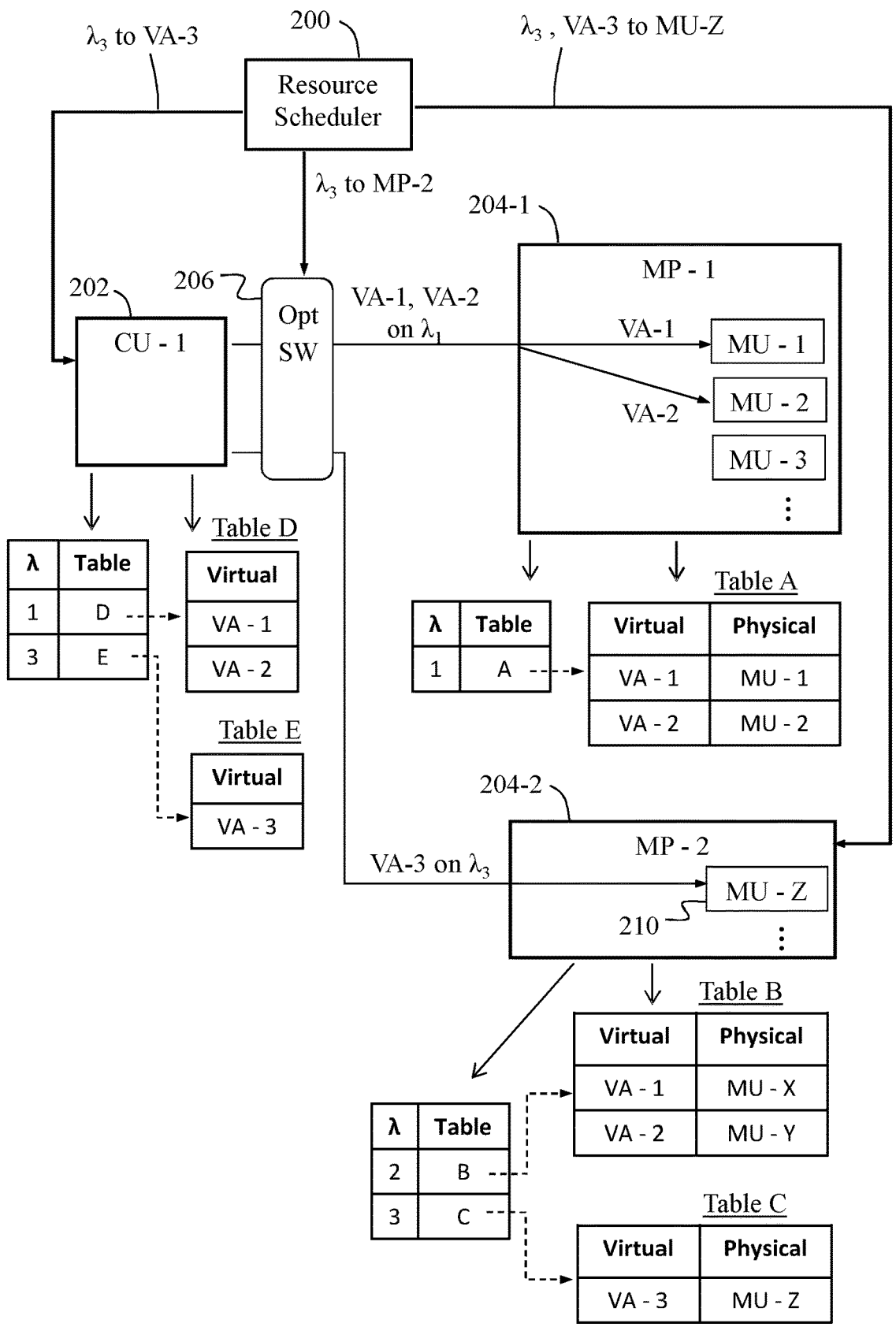
FIG. 7 is a diagram illustrating an example how the resource scheduler may reconfigure a mapping in a computing unit CU-1 when allocating increased storing resources in an added memory pool MP-2, according to further example embodiments.

As a fourth usage case, FIG. 7 illustrates the above-mentioned embodiment where an added memory unit 210 in a new memory pool 204-2 denoted MP-2 is allocated to the computing unit 202, e.g. to increase the memory capacity for the computing unit 202. Thus, it is assumed that an optical wavelength $\lambda_1$ has already been assigned for communication between the computing unit 202 and two memory units in a first memory pool 204-1 denoted MP-1. In addition, another optical wavelength $\lambda_3$ is assigned for communication between the computing unit 202 and the added memory unit 210 in the new memory pool 204-2. In this case, the resource scheduler 200 reconfigures the computing unit 202 and the optical switch(es) 206 with a new first mapping as follows.

It is further assumed that the computing unit 202 and the first memory pool 204-1 have already been configured with a first mapping which basically maps the wavelength $\lambda_1$ to virtual addresses VA-1 and VA-2 associated to two memory units MU-1 and MU-2, respectively, in the first memory pool 204-1. The first mapping is implemented in the computing unit 202 as a mapping of wavelength $\lambda_1$ to a table D which in turn identifies the virtual addresses VA-1 and VA-2. The first mapping is further implemented in the first memory pool 204-1 as a mapping of wavelength $\lambda_1$ to a table A which likewise identifies the virtual addresses VA-1 and VA-2.

The first memory pool 204-1 has also been configured with a second mapping implemented as a table A which maps the virtual addresses VA-1 and VA-2 to corresponding physical addresses MU-1 and MU-2. The resource scheduler 200 has also configured the optical switch(es) 206 with a mapping of wavelength $\lambda_1$ to the memory pool 204-1, MP-1.

In this example, the resource scheduler 200 at some point assigns the new optical wavelength $\lambda_3$ for communication between the computing unit 202 and the added memory unit 210 in the new memory pool 204-2. The resource scheduler 200 therefore reconfigures the first mapping in the computing unit 202 and the optical switch(es) 206 to map the new optical wavelength $\lambda_3$ to a virtual address VA-3 of the added memory unit 210 denoted MU-Z in the memory pool 204-2.

The resource scheduler 200 also configures the memory pool 204-2 with a first mapping which maps the wavelength $\lambda_3$ to the virtual address VA-3 by pointing to a table C, and with a second mapping which basically comprises the table C which maps the virtual address VA-3 to the physical address denoted MU-Z.

Thereby, when the computing unit 202 sends a message on the wavelength $\lambda_1$ with VA-1 as destination, the message will be routed to the first memory pool 204-1 according to the wavelength $\lambda_1$. The memory pool 204-1 will then route the message to MU-1 based on the first and second mappings in the memory pool 204-1 which indicate that VA-1 is associated with MU-1 for wavelength $\lambda_1$. Likewise, when the computing unit 202 sends a message on the wavelength $\lambda_1$ with VA-2 as destination, the memory pool 204 will route the message to MU-2 based on the first and second mappings which indicate that VA-2 is associated with MU-2 for wavelength $\lambda_1$.

When the computing unit 202 further sends a message on the wavelength $\lambda_3$ with VA-3 as destination, the message will be routed to memory pool 204-2 according to the wavelength $\lambda_3$, and the memory pool 204-2 will route the message to MU-Z based on the first and second mappings therein which indicate that VA-3 is associated with MU-Z for wavelength $\lambda_3$. This figure shows that the memory pool 204-2 has also been configured with another first mapping that maps wavelength $\lambda_2$ to virtual address VA-1 and VA-2 by pointing to a table B, and with a second mapping which basically comprises the table B which maps the virtual addresses VA-1 and VA-2 to physical address MU-X and MU-Y, respectively. However, the computing unit 202 of this example has not been configured to use wavelength $\lambda_2$ which may be used by some other computing unit(s), not shown.

Figure 8:
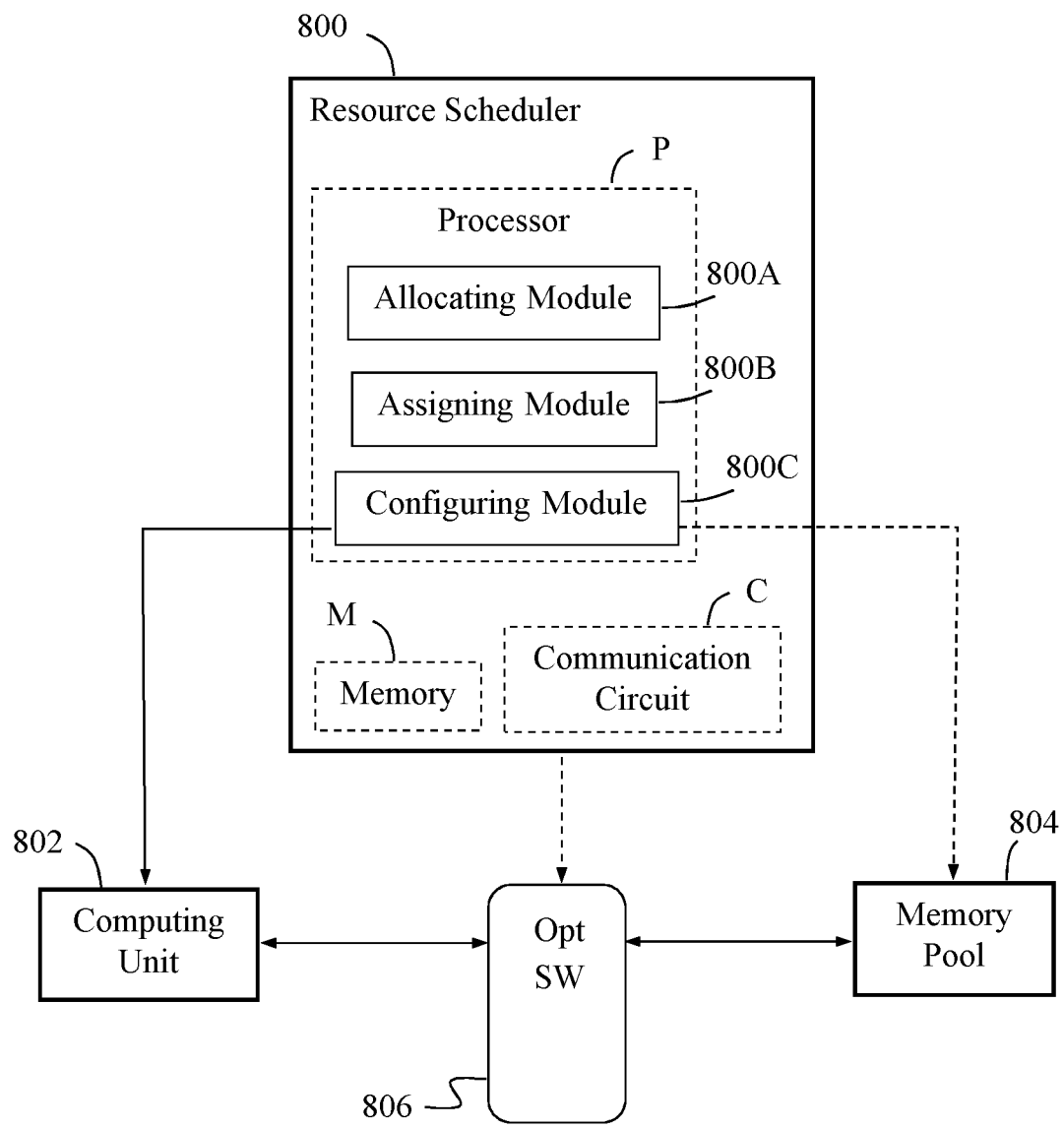
FIG. 8 is a block diagram illustrating how a resource scheduler may be structured, according to further example embodiments.

The block diagram in FIG. 8 illustrates a detailed but non-limiting example of how a resource scheduler 800 may be structured to bring about the above-described solution and embodiments thereof. The resource scheduler 800 may be configured to operate according to any of the examples and embodiments for employing the solution as described herein, where appropriate and as follows. The resource scheduler 800 is shown to comprise a processor P and a memory M, said memory comprising instructions executable by said processor whereby the resource scheduler 800 is operable as described herein. The resource scheduler 800 also comprises a communication circuit C with suitable equipment for sending and receiving packets in the manner described herein.

The communication circuit C may be configured for communication with a computing unit 802 corresponding to the computing unit 202 in FIG. 2, and for communication with a memory pool 804 which corresponds to the memory pool 204 in FIG. 2, using suitable protocols and interfaces. Such communication may be performed over any suitable interfaces and nodes depending on the implementation, although this is not necessary to describe here as such in any detail. The solution and embodiments herein are thus not limited to using any specific types of messages or protocols for communication.

The resource scheduler 800 comprises means configured or arranged to basically perform at least some of the actions in FIG. 3, and more or less as described above for the resource scheduler 200 in various examples. In FIG. 8, the resource scheduler 800 is arranged or configured to enable a computing unit 802 to use memory resources in a remote memory pool 804.

The resource scheduler 800 is operable to allocate a memory unit in the remote memory pool to the computing unit for usage of memory resources in the allocated memory unit. This operation may be performed by an allocating module 800A in the resource scheduler 800, e.g. in the manner described above for action 302. The allocating module 800A could alternatively be named a scheduling module or selecting module.

The resource scheduler 800 is further operable to assign an optical wavelength $\lambda_1$ for communication between the computing unit and the allocated memory unit over an optical network 806. This operation may be performed by an assigning module 800B in the resource scheduler 800, e.g. as described above for action 304. The assigning module 800B could alternatively be named an ascribing module.

The resource scheduler 800 is also operable to configure the computing unit with a first mapping between the assigned optical wavelength and the allocated memory unit. This obtaining operation may be performed by a configuring module 800C in the resource scheduler 800, basically as described above for action 306. The configuring module 800C could alternatively be named a sending module.

It should be noted that FIG. 8 illustrates various functional modules or units in the resource scheduler 800, and the skilled person is able to implement these functional modules in practice using suitable software and hardware. Thus, the solution is generally not limited to the shown structures of the resource scheduler 800, and the functional modules or units 800A-C therein may be configured to operate according to any of the features and embodiments described in this disclosure, where appropriate.

The functional modules or units 800A-C described above can be implemented in the resource scheduler 800 by means of suitable hardware and program modules of a computer program comprising code means which, when run by the processor P causes the resource scheduler 800 to perform at least some of the above-described actions and procedures.

In FIG. 8, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the resource scheduler 800 in the form of a memory having a computer readable medium and being connected to the processor P. The computer program product or memory in the resource scheduler 800 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the resource scheduler 800.

The solution described herein may thus be implemented in the resource scheduler 800 by a computer program comprising instructions which, when executed on at least one processor, cause the at least one processor to carry out the actions according to any of the above embodiments and examples, where appropriate. The solution may also be implemented in a carrier containing the above computer program, wherein the carrier is one of an electronic signal, an optical signal, a radio signal, or a computer readable storage product or computer program product.

While the solution has been described with reference to specific exemplifying embodiments, the description is generally only intended to illustrate the inventive concept and should not be taken as limiting the scope of the solution. For example, the terms "resource scheduler", "computing unit", "memory pool", "memory resources", "first/second mapping", "mapping table", "virtual address" and "physical address" have been used throughout this disclosure, although any other corresponding entities, functions, and/or parameters could also be used having the features and characteristics described here. The solution is defined by the appended claims.

The invention claimed is:

1. A method performed by a resource scheduler for enabling a computing unit to use memory resources in a remote memory pool, the method comprising:

allocating a memory unit in the remote memory pool to the computing unit for usage of memory resources in the allocated memory unit;
assigning an optical wavelength for communication between the computing unit and the allocated memory unit over an optical network; and
configuring the computing unit with a first mapping between the assigned optical wavelength and the allocated memory unit, wherein the first mapping comprises a range of virtual addresses mapped to the assigned optical wavelength.

2. The method according to claim 1, wherein the resource scheduler further configures the remote memory pool with said first mapping and a second mapping that maps at least one virtual address to a physical address of the allocated memory unit within the remote memory pool.

3. The method according to claim 2, wherein the resource scheduler allocates a new memory unit in the same memory pool to the computing unit and reconfigures the second mapping in the remote memory pool to map the at least one virtual address to a physical address of the new memory unit.

4. The method according to claim 1, wherein the resource scheduler configures at least one optical switch in the optical network with a mapping between the assigned optical wavelength and the memory pool.

5. The method according to claim 1, wherein the resource scheduler performs the method in response to receiving a request for connecting the computing unit with at least one memory unit.

6. The method according to claim 1, wherein the resource scheduler assigns said optical wavelength for communication between the computing unit and at least two memory units in the remote memory pool, and said first mapping maps the assigned optical wavelength to the at least two memory units.

7. The method according to claim 1, wherein the resource scheduler assigns different optical wavelengths for communication between at least two computing units and memory units in the remote memory pool over the optical network, and configures each computing unit with a respective first mapping between a corresponding assigned optical wavelength and the memory units.

8. The method according to claim 1, wherein the resource scheduler allocates an added memory unit in a new memory pool to the computing unit, assigns a new optical wavelength for communication between the computing unit and the added memory unit, and reconfigures the first mapping in the computing unit to map the new optical wavelength to a range of virtual addresses.

9. The method according to claim 8, wherein the resource scheduler configures at least one optical switch with a mapping of the new optical wavelength to the new memory pool and the computing unit.

10. A resource scheduler arranged to enable a computing unit to use memory resources in a remote memory pool, the resource scheduler comprising:
a processor; and
a memory containing instructions which, when executed by the processor, cause the resource scheduler to:
allocate a memory unit in the remote memory pool to the computing unit for usage of memory resources in the allocated memory unit;
assign an optical wavelength for communication between the computing unit and the allocated memory unit over an optical network; and
configure the computing unit with a first mapping between the assigned optical wavelength and the allocated memory unit, wherein the first mapping comprises a range of virtual addresses mapped to the assigned optical wavelength.

11. The resource scheduler according to claim 10, wherein the resource scheduler is further to configure the remote memory pool with said first mapping and a second mapping that maps at least one virtual address to a physical address of the allocated memory unit within the remote memory pool.

12. The resource scheduler according to claim 11, wherein the resource scheduler is to allocate a new memory unit in the same memory pool to the computing unit, and to reconfigure the second mapping in the remote memory pool to map the at least one virtual address to a physical address of the new memory unit.

13. The resource scheduler according to claim 10, wherein the resource scheduler is to configure at least one optical switch in the optical network with a mapping between the assigned optical wavelength and the memory pool.

14. The resource scheduler according to claim 10, wherein the resource scheduler is to perform said allocating, assigning and configuring in response to receiving a request for connecting the computing unit with at least one memory unit.

15. The resource scheduler according to claim 10, wherein the resource scheduler is to assign said optical wavelength for communication between the computing unit and at least two memory units in the remote memory pool, and wherein said first mapping maps the assigned optical wavelength to the at least two memory units.

16. The resource scheduler according to claim 10, wherein the resource scheduler is to assign different optical wavelengths for communication between at least two computing units and memory units in the remote memory pool over the optical network, and to configure each computing unit with a respective first mapping between a corresponding assigned optical wavelength and the memory units.

17. The resource scheduler according to claim 10, wherein the resource scheduler is to allocate an added memory unit in a new memory pool to the computing unit, to assign a new optical wavelength for communication between the computing unit and the added memory unit, and to reconfigure the first mapping in the computing unit to map the new optical wavelength to a range of virtual addresses.

18. The resource scheduler according to claim 17, wherein the resource scheduler is to configure at least one optical switch with a mapping of the new optical wavelength to the new memory pool and the computing unit.

* * * * *